Oct. 28, 1952   A. SMAIL   2,615,385
DEVICE FOR BREWING OR INFUSING TEA OR OTHER BEVERAGES
Filed Feb. 23, 1950
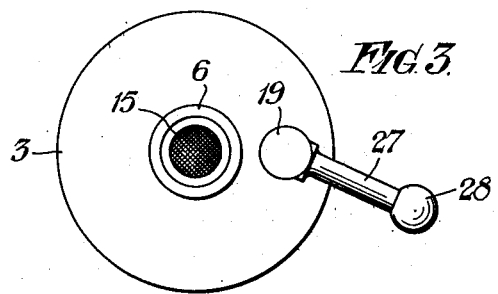
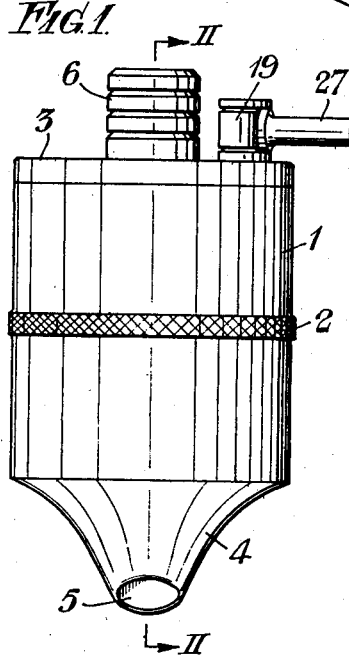
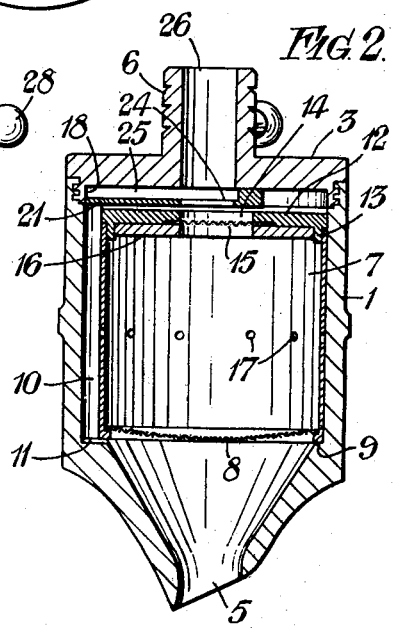
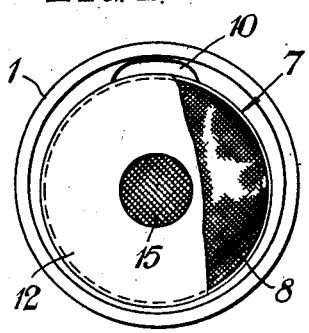
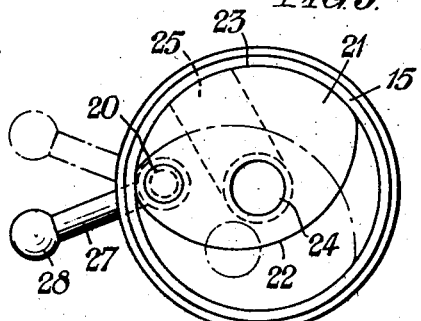
INVENTOR
ALEXANDER SMAIL
By: Haseltine, Lake & Co.
AGENTS Patented Oct. 28, 1952

2,615,385

UNITED STATES PATENT OFFICE 2,615,385

DEVICE FOR BREWING OR INFUSING TEA OR OTHER BEVERAGES

Alexander Smail, Virginia Water, England

Application February 23, 1950, Serial No. 145,717
In Great Britain February 22, 1949

2 Claims. (Cl. 99—305)

This invention relates to devices for brewing or infusing tea or other beverages and has for its chief object to evolve such a device adapted for application to a kettle, urn or other water container.

According to the present invention there is provided a device for brewing or infusing tea or other beverage, comprising a casing or body member having an inlet adapted to be connected to the spout or the like of a kettle, urn or other vessel, said body member being formed with an outlet, and further comprising a perforated or porous container adapted to be disposed within said body member and to hold a supply of tea or other desired substance, the arrangement being such that when water is caused to flow from the kettle, urn or other vessel and hence through the said body member to the outlet of the latter, it will pass through said tea or other substance and will brew or infuse the same.

For a better understanding of the invention and to show how the same may be carried into effect reference will now be made to the accompanying drawings in which:

Figure 1 is a side elevation of a device made in accordance with the invention,

Figure 2 is a longitudinal section taken upon the line II—II of Figure 1.

Figure 3 is a plan view corresponding to Figure 1.

Figure 4 is a plan view similar to Figure 3, but with the top closure of the device removed and, Figure 5 is an inverted plan view of the top closure of the device removed in the illustration of Figure 4.

As appears from Figure 1, the device essentially includes a casing or body 1 having a knurled ridge 2 and a removable top closure 3. The lower end of the body 1 has a spout-like portion 4 formed with an orifice or outlet 5. The closure 3 has an integral nipple 6 which is externally ribbed to provide a liquid-tight connection with a hose (not shown) that may be placed over the nipple 6.

As seen best in Figure 2, the casing or body 1 has an internal cylindrical hollow for the accommodation of a cylindrical container 7. A piece of wire gauze 8 is located in the cylindrical container 7 and serves as the bottom wall thereof. The container 7 is seated upon an annular shoulder 9 formed within the body member 1. The internal cylindrical walls of the body member 1 are discontinuous over a relatively small zone, there being a longitudinal shallow groove 10 formed in such side walls. The transverse extent of the longitudinal groove 10 is shown in Figure 4. In Figure 2 the longitudinal extent of the groove 10 is indicated, and it is to be observed that the groove is extended through the annular shoulder 9 whereby a passage 11 is effectively provided communicating as between the groove 10 and the outlet 5. The container 7 has a removable upper closure 12, the latter possessing an integral depending flange 13 adapted to fit within the mouth of the container 7. A central aperture 14 is formed in the closure member 12, such aperture being closed by a piece of gauze 15 held in position by an annular member 16 accommodated in the circular flange 13. The container 7 has a ring of small apertures 17 formed in the curved side walls.

The closure member 3 for the body member 1 has a depending skirt 18 which is externally threaded. The mouth of the body member 1 which receives the closure is correspondingly internally screw-threaded. The screw-threading is preferably of the type having square cross-section threads, and is quick in its action thus serving as a simple form of locking means for the closure 3. A post 19 is mounted upon the outer side of the closure 3, the post being effectively integral with a pin 20 upon which a baffle plate 21 is mounted. As appears from Figure 5, the baffle plate 21 is oval in shape possessing two arcuate side edges 22 and 23 which have the same curvature as the internal wall of the skirt 15 of the closure 3. The plate 21 is apertured at 24, such aperture being disposed off-centre in the plate. The plate 21 has a rectangular section groove cut in the face thereof adjacent the contiguous inner face of the closure 3. The groove is indicated in dotted lines in the plan of Figure 5 at 25, whilst a longitudinal section through the groove is seen at 25 in Figure 2. It will be appreciated that the groove 25 effectively provides a passageway extending from the arcuate side edge 23 of the baffle plate to the aperture 24 therein. The bore 26 of the nipple 6 is slightly greater in diameter than the aperture 24. The post 19 has a laterally projecting arm 27 provided with a heat insulating knob 28.

In the employment of the device described above it will be understood that the nipple 6 is connected as by a hose to a source of boiling water. Such source may consist of a kettle or like vessel, or an urn. The body member 1 may be easily detached from its closure 3, whereupon the container 7 may be withdrawn from the body member. Upon removing the closure 12 of the container, tea or other substance can be placed within the container, the tea or the like being supported upon the gauze 8. The closure 12 can then be replaced and the container 7 may be returned to the body member 1. Upon replacement of the body member 1 upon the closure 3 thereof, the device is prepared for operation. Boiling water may now be released into the nipple 6 from whence it will run through the aperture 24 in the baffle plate 21, when the device is in the position illustrated in the full lines in Figure 5, and in Figure 2. The boiling water will pass directly through the aperture 14 and hence will pass into the interior of the container 7. From the container 7 the boiling water having contacted the tea or the like, may escape through the side apertures 17 and also through the perforated or porous bottom wall 8, and hence a prepared beverage will flow from the outlet 5. A certain amount of the boiling water entering the nipple 6 will pass through the longitudinal groove 10 and will escape via the passageway 11 into the outlet 5. However, the main tendency will be for the boiling water to pass into the container 7.

If the arm 27 is swung angularly from the illustrated position with the aid of the knob 28 then the effect will be to displace the baffle plate 21 from the full-line position shown in Figure 5 towards the position thereof illustrated in chain-dotted lines. This will have the effect of bringing the aperture 24 in the baffle plate progressively further out of register with the bore 26 of the nipple 6. The groove 25 in the baffle plate will simultaneously be brought progressively beneath the bore 26 and will thus tend progressively to supply increasing amounts of the boiling water to the groove 10 from whence it will be by-passed through the passage 11 directed to the outlet 5. When the aperture 24 is completely out of register with the bore 26 the water entering the nipple 6 will be mainly directed towards the by-pass groove 10 and passage 11, so that a minimum amount of water will be supplied to the container 7. Thus it will be appreciated that by adjustment of the arm 27 the rate of flow of boiling water through the charged container 7 will be variable. Hence the strength of the beverage dispensed through the outlet 5 will be correspondingly variable.

It will be appreciated that the constructional embodiment described above may be varied as to details. Thus the screw-threaded connection between the closure and the body member may be replaced by any other convenient form of connection such as a bayonet joint. The requirements are simply that the connection shall be reasonably fluid-tight whilst being easily disengageable.

Although the device has been described and illustrated as being readily removable from the kettle, urn or the like to which it is to be applied, it will be appreciated that the nipple 6 of the closure member could be fixed permanently to the spout of say a kettle, or be even integral therewith. This has the advantage that when the kettle is boiling, steam will pass through the tea or the like that may be in the container prior to the pouring of the water therethrough. This will assist in the brewing or infusing operation.

I claim:

1. A device for brewing beverages, such device being adapted for external application to a spout of a vessel capable of holding water to be heated and comprising a casing member having an inlet and an outlet said inlet being adapted to be connected to the spout, a perforated or porous container adapted to be disposed within said casing member intermediate the inlet and outlet and to hold a supply of a substance from which the beverage is to be brewed or infused, a bypass channel arranged within said casing member such channel extending effectively from the inlet to the outlet of the casing member and a baffle plate disposed within the casing member, said baffle plate being adjustably displaceable so that when water is caused to flow from the vessel and through said casing member a preselected proportion may be caused to pass through the substance in the container while the remainder is diverted to the bypass channel, the arrangement being such that the strength of the beverage issuing from the outlet of said casing member will be controlled.

2. A device for brewing beverages such device being adapted for external application to a spout of a vessel capable of holding water to be heated and comprising a cylindrical casing member having at one end a removable closure in which an inlet is provided and at the opposite end a spoutlike outlet, a container also of cylindrical form and adapted to be disposed within said casing member intermediate the inlet and the outlet, said container including at least one perforate wall and a removable closure which is formed with an inlet opening and serving to hold a supply of a substance from which the beverage is to be brewed or infused, a bypass channel arranged within said casing member such channel extending effectively from the inlet to the outlet of the casing member and an adjustably displaceable baffle plate disposed within the casing member adjacent the inner face of the closure member of the latter, said baffle plate having an aperture that may register with the inlet in said closure member to permit liquid to enter the container and the contiguous face of the baffle plate having a groove formed therein, which extends from the aperture in said baffle plate to the side edge of the latter, said groove in the baffle plate serving to direct water to the bypass channel and the arrangement being such that when water is caused to flow from the vessel and through the casing member to the outlet it will be possible by appropriate setting of said baffle plate to ensure that a preselected proportion of such water will pass through the substance in the container while the remainder will be directed via said groove to the said bypass channel.

ALEXANDER SMAIL.

REFERENCES CITED

The following references are of record in the file of this patent:

UNITED STATES PATENTS

| Number | Name | Date |
|---|---|---|
| 542,731 | Halstead | July 16, 1895 |
| 1,062,236 | Hitchcock | May 20, 1913 |
| 1,075,727 | Reichert | Oct. 14, 1913 |
| 1,317,717 | McKenney | Oct. 7, 1919 |
| 1,507,806 | Zeller | Sept. 9, 1924 |
| 1,624,526 | Bohmsack | Apr. 12, 1927 |
| 2,020,104 | Collin | Nov. 5, 1935 |
| 2,205,290 | Herrera | June 18, 1940 |

FOREIGN PATENTS

| Number | Country | Date |
|---|---|---|
| 136,434 | Germany | Nov. 25, 1902 |